Patented Aug. 20, 1946

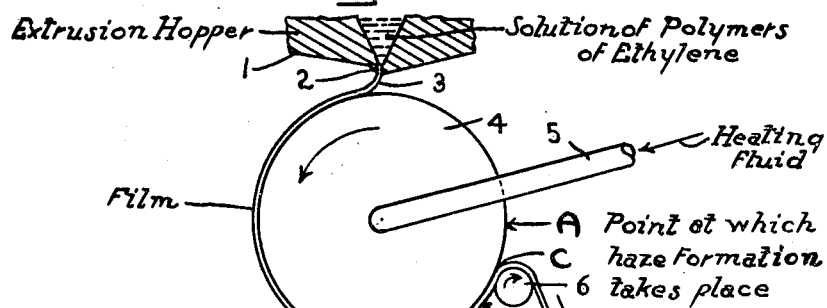

2,405,977

UNITED STATES PATENT OFFICE 2,405,977

FILM MANUFACTURE

Franklin Traviss Peters, Wilmington, Del., assignor to E. I. du Pont de Nemours & Company, Wilmington, Del., a corporation of Delaware Application September 2, 1943, Serial No. 500,989

2 Claims. (Cl. 18—57)

This invention relates to film manufacture, and more particularly to improvements in the production of films from normally solid polymers of ethylene.

The polymers of ethylene with which this invention is concerned are solid polymers obtained by known procedures through the polymerization with heat and pressure of ethylene alone or of mixtures consisting of ethylene and another compound containing at least one polymer forming unsaturated linkage. These polymers can be obtained, for example, by heating ethylene or the mentioned mixture thereof under a pressure above 500 atmospheres and preferably above 1000 atmospheres at temperatures of from 100° to 400° C., and preferably from 150° to 250° C. as described in United States Patents 2,153,553, 2,188,465, and 2,200,429. Another method of making these ethylene polymers consists in heating the ethylene alone or in admixture with another polymerizable compound in contact with water and a per-compound catalyst at temperatures in the range of 40° to 350° C. and at superatmospheric pressures in excess of 3 atmospheres. The polymers of ethylene alone are normally solid, correspond in composition substantially to $(CH_2)_x$, show a crystalline pattern by X-ray diffraction analysis, and in general melt in the range of about 100° to about 120° C. The physical properties of the polymers of ethylene with other polymerizable organic compounds vary depending upon the composition of the polymer and the nature of the organic compound polymerized with the ethylene.

Films of the normally solid polymers of ethylene referred to above are crystalline and translucent unless they are heated above the melting point of the polymer and then shock cooled, that is, cooled very rapidly below the melting point. This cooling can be effected by casting a film of the molten polymer on a cold support, or by quenching the molten film with a cooling liquid. The requirement that the film be heated above the melting point of the polymer before it is quenched prevents the use of a heated conventional casting drum as a support for the molten film during quenching since a greater differential between the casting and quenching temperatures is required than can be maintained between two points on the periphery of the drum.

This invention has as an object to provide a new and improved method for obtaining clear ethylene polymer films. A further object is a method for casting these ethylene polymer films which avoids the disadvantages of melt casting and the necessity for heating the film above the melting point before quenching.

The above objects are accomplished by a method more particularly described hereinafter which comprises casting a film on a support from a solution of the polymer of ethylene, the solution being at a temperature above the melting point of the polymer and the support being at a temperature below the melting point of the polymer but not lower than 15° C. below the melting point, evaporating the solvent, and, just prior to the time at which crystallization and haze formation would occur, bringing the film and its support in contact with a non-solvent cooling liquid, and then stripping the film from the casting surface.

The invention will be better understood in connection with the accompanying drawing in which:

Fig. 1 is a view in elevation of one form of apparatus suitable for carrying out the invention, Fig. 2 is a similar view of a modified apparatus, and Fig. 3 is an elevational view of a further modified apparatus.

In Figs. 1 and 2 the numeral 1 indicates a conventional extrusion hopper having an extrusion lip 2 past which the film 3 of polymer solution flows through a slot, not shown, to the casting drum 4. A conduit 5 passes to the interior of the drum in known manner at its axis of rotation to provide means for introducing heating fluid, preferably a mixture of hot water and steam, to the interior of the drum. A similar conduit, not shown, is provided at the other side of the drum for removal of the heating fluid. As the film is stripped from the drum in Fig. 1 at the point C it passes over a roll 6 to a drying apparatus, not shown, which can consist of a heated cabinet or a series of warm rollers, etc., and is then wound up in a roll. A nozzle 7 is placed to direct a spray of cold water against the film at the point B within the required period of time before crystallization and haze formation would occur. The point A indicates the point on the drum where haze formation would occur had not the film been rapidly chilled at the proper time before that point is reached. The position of the point A on the drum, and hence that of point B where the cooling liquid is applied will depend on particular conditions of operation, as will be further referred to later.

In Fig. 2 the spray of water is replaced with a stream of water which flows through a shallow tank 8 and against a small area of the underside of the drum. The point D on the drum corresponds to the point A in Fig. 1 and the water likewise contacts the film within the required time before haze formation would occur. The film, after being stripped from the drum by passing over a roller 9 mounted in the tank 8, is led under a second roller 10 and then to suitable wind up mechanism not shown.

In Fig. 3 the film of ethylene polymer solution is flowed on a film casting surface or flat plate 11 by a spreader blade or other means to obtain the desired film thickness. This film casting surface is the upper side of a hollow steel box 12 and is heated by means of a stream of hot water entering the box at 13 and leaving by the outlet 14. This steel box 12 is enclosed in a larger box 15 on the bottom of which the steel box 12 rests on supports 16. Box 15 is provided with a removable lid 17 having a window 18 to observe the condition of the film. Warm air is passed through the box from an inlet 19 to an outlet 20 to control the evaporation rate of the solvent from the film. The film is quenched at the proper time by removing the lid and applying water to the film.

The time at which crystallization and haze formation would occur and therefore the time just prior to this condition when the shock cooling is applied, is determined empirically for the particular casting equipment and evaporation conditions used. This interval which exists between the first moment at which the non-solid film can be quenched to a clear solid film and the moment it will crystallize and become translucent if not quenched may be referred to as the critical time interval, which varies somewhat in magnitude with a number of other variables. If quenching is carried out before this interval the liquid film will be converted to a weak, opaque, white film. Quenching is, of course, useless after this time.

By operating at a temperature below the melting point of the polymer (defined herein as the temperature at which the haze disappears from a crystalline solid film as it is subjected to gradually increasing temperature, for example, at the rate of 1° C. per minute), but not more than 15° C. below, it is possible to maintain a time interval defined above within which the quenching can be applied to yield clear films and the method conducted as a continuous process. The most favorable operating conditions with regard to temperature are from 7° C. to 15° C. below the melting point of the polymer. Within the above mentioned temperatures the critical time interval does not vary significantly with the temperature except as temperature affects evaporation rate of the solvent. The rate of solvent evaporation from the liquid film flowed out from the polymer solution, however, has a marked effect on the critical time interval, which decreases as the rate of solvent evaporation is increased. Solvent evaporation so rapid that this interval is too short for the quenching process to be controlled is therefore avoided. At a given temperature the rate of solvent evaporation can be controlled by regulating the rate of air flow used to remove solvent vapor above the film.

A valuable embodiment of this invention resides in the increased critical time interval which can be obtained by incorporating with the polymer solution aluminum soaps and related materials which are referred to in more detail hereinafter.

In a typical procedure 100 parts of an ethylene polymer melting at 105° C. and one part of aluminum palmitate are dissolved in 399 parts of hot xylene. This solution is heated to a temperature in the range from 110° to 120° C. and flowed from an extrusion hopper or suitable spreader blade on a rotating hollow casting drum such as that shown in Fig. 1 of the drawing. The drum is maintained at 94° to 98° C. by circulating through its interior a mixture of hot water and steam. The rate of solvent evaporation from the liquid film is controlled by circulation of heated air above the film surface. The rate of evaporation is thus regulated and the speed of the rotation of the drum is also regulated so that the film becomes substantially solvent-free, solid, and crystalline when it reaches point A in Fig. 1. However, as soon as these adjustments have been made so that crystallization occurs at the point A, a spray of cold water is directed against the film at point B on the drum's periphery, thus causing it to solidify without crystallization and haze formation. The film is stripped from the drum back to the point C, where it leaves the water spray. As the drum rotates and casting continues, the film is drawn off the drum at this point as described in connection with Fig. 1. The evaporated xylene can be recovered for reuse by passing the vapors through a conventional solvent recovery system.

Although the spray of cold water tends to reduce the drum temperature, the desired range of 94° to 98° C., as measured at the point of casting, can be maintained by increasing the temperature and rate of flow of the inlet water and steam used to heat the drum. The water clinging to the drum's surface above the point of quenching and stripping is removed, as by blowing it off with a blast of hot air, before the point of casting is reached on the next cycle. The rate of solvent evaporation and rotation of the drum can also be adjusted so that if no shock cooling is carried out the crystallization takes place just beyond the lowest point on the drum's periphery, as at the point D in Fig. 2 where the water spray is replaced by a stream of water flowing against a small area of the under side of the drum.

The invention is further illustrated by the following examples in which the parts are by weight.

*Example I*

To 1500 parts of an ethylene polymer having a melting point of 105° C. is added 15 parts of aluminum palmitate and the mixture is dissolved in 6000 parts of xylene by heating and stirring together under reflux at about 120° C. This solution at 120° C. is extruded, by means of an extrusion head having a slot orifice with a clearance of 0.010" between the lips, on the surface of a rotating hollow stainless steel casting drum (6 feet in diameter) at the highest point of the drum's periphery. The drum is rotated at a peripheral speed of 20 feet per minute and is heated to 94° to 98° C. by circulating a mixture of water and steam through its interior. After the liquid film is formed the xylene is evaporated. At a point about 1 foot beyond the lowest point of the drum's periphery, that is, at point B in Fig. 1, the drum is sprayed with water at 10° C., whereupon a self-supporting film is formed. The film is stripped at the point (C in Fig. 1) at which it leaves the water spray. As the process continues the film is led away over rollers and wound up on a roll. The temperature at the surface of the drum, at the point of casting, is maintained at 94° to 98° C. by adjusting the flow of steam and water through its interior. The film obtained by this process is transparent, tough, and flexible. It has a tensile strength of 1800 lbs./sq. in. and an elongation at the breaking point of 250%.

*Example II*

To 1500 parts of an ethylene polymer having a melting point of 110° C. is added 15 parts of magnesium stearate and the mixture dissolved in 6000 parts of toluene by heating and stirring together under reflux at 120° C. This solution is flowed out with a spreader blade having a clearance of 0.012" on the film casting surface or flat plate 11 shown in Fig. 3 which is heated to 100° C. by hot water flowing through the steel box 12, as previously described. A current of warm air passing from the inlet 19 through the outlet 20 circulates through the chamber formed by the box 15 containing the casting surface and removes the toluene vapor formed as the film dries. The condition of the film can be observed through a window in the lid. After the film has dried for about 3 minutes, cold water (about 20° C.) is poured onto a portion of the film. Heating of the plate is continued by circulating a stream of water at 100° C. through the interior of the steel box. After about another 3 minutes the portion of the film which has not been wet with water becomes hazy and crystalline. The portion that is wet with water remains clear and non-crystalline. The steel casting box is cooled to about 80° C. and the film is stripped. The portion of the film which has been wet with water remains transparent and non-crystalline; the part that has not been wet with water remains hazy and crystalline. The clear film has substantially the same tensile strength and elongation as that described in Example I.

The following experiment, which is illustrative of the value of the class of modifying agents used for increasing the critical time interval, compares the results obtained from films made from two solutions of the polymer each of which is composed of 1500 parts of the polymer (melting point 105° C.) dissolved in 6000 parts of xylene, but only one of which contains aluminum stearate (15 parts). A film from each solution was flowed out at 100° C. These films were flowed, simultaneously and under opposite sides of the same spreader blade having a clearance of 0.012," on the casting plate 11 described in connection with Fig. 3, and the behavior of the two films was observed through the window 18. Pouring cold water on the film not containing the aluminum soap within the time interval of from about 4 to 4.25 minutes after casting sets the film to a clear solid film. This film or that containing the aluminum soap cannot be quenched before about 4 minutes without becoming opaque, white and weak, but the film containing the aluminum soap can be quenched to a clear non-crystalline film at any time during the much longer period of from 4 to 8 minutes after casting.

The modifying agents used to increase the critical time interval are of the formula $X(R)_a(Y)_b$, in which X is a member of the class consisting of hydrogen and metals, R is a member of the class consisting of carboxylic and sulfonic acid radicals containing from 6 to 30 carbon atoms and preferably from 10 to 30 carbon atoms, Y is an hydroxyl group, $a$ is an integer ranging from 1 to the valence of X, $b$ is an integer ranging from 0 to one less than the valence of X, and the sum of $a$ plus $b$ is equal to the valence of X. In this definition the ammonium ion and alkyl substituted ammonium ions are regarded as metals.

Comparative critical time intervals for ethylene polymer films containing various modifying agents of the kind referred to above are shown in the following table:

| Composition | Critical time interval in seconds |
| --- | --- |
| Unmodified ethylene polymer | 15 |
| 1% aluminum palmitate | 240 |
| 1% aluminum stearate | 120 |
| 1% magnesium stearate | 180 |
| 1% titanium tetrastearate | 90 |
| 10% titanium tetrastearate | 60 |
| 1% sodium oleate | 30 |
| 1% ammonium stearate | 30 |
| 1% potassium naphthenate | 30 |
| 1% zinc stearate | 45 |
| 1% palmitic acid | 30 |

The per cent of each modifier indicated in the above table is calculated on the weight of ethylene polymer used. All solutions used for casting the films were in xylene and contained 10% of an ethylene polymer having a melting point at 105° C. The films were all cast at 100° C. under a spreader blade having a clearance of 0.012". The evaporation conditions were the same for all the films and were such that the unmodified film was substantially solvent-free and crystallized 4 minutes after casting. More rapid evaporation will shorten the critical time interval for each of the compositions indicated in the table. Conversely, slower evaporation will lengthen the critical time intervals. However, the ratio between the critical time intervals of two different compositions is substantially independent of the evaporation rate. Thus, it will be seen that the process is more easy to control if a modifying agent of the kind pointed out above is used. The preferred modifying agent is aluminum palmitate. Aluminum salts of other long chain aliphatic acids and magnesium salts of these acids also are very effective modifying agents. Similar salts of alkaline earth metals, alkali metals, ammonia and amines, as well as the long chain acids themselves, also are operable, but do not increase the critical time intervals as markedly as the aluminum salts. Effective concentrations of these modifying agents, based on the ethylene polymer, are from about 0.1% to about 10%.

The critical time interval will vary appreciably with the solvent used. Aliphatic hydrocarbons having boiling points above about 100° C. also are suitable. Chlorinated hydrocarbons having boiling points above about 100° C. are also operable but have substantially smaller critical time intervals.

The quenching liquid is preferably water having a temperature of from 0° to 10° C. The temperature of the water can, however, be considerably higher, and temperatures as high as 70° C. can be used if the water is kept flowing rapidly. The higher temperatures are less desirable because of greater tendency toward partial crystallization and slight haze formation. The water should flow against and then away from the film so that it does not become stagnant and heated at the point where it contacts the film. In place of water various other quenching liquids, such as alcohols, esters and ethers, which are non-solvents for the polymer can be used.

The temperature of the ethylene polymer solution from which the film is formed is not particularly important, except that as in any solution casting process it should be below the boiling point but somewhat higher than the temperature of the casting support in order to prevent the formation of vapor bubbles in the film. The concentration of the ethylene polymer in the solution is preferably about 25% by weight, but can range from 5% to 40%.

Although the present process is most advantageously carried out on a drum as the casting support, other types of casting supports, such as an endless belt, can be used. This invention is also applicable to coating of various substrates, including paper, cloth, and the like.

The transparent films prepared by the process of this invention are characterized by high flexibility, high resistance to tearing, retention of toughness at very low temperatures, and excellent waterproofness and moisture impermeability. Because of these properties they are well adapted as protective wrappings for food, tobacco, medicinal products, clothing and the like. They are also useful as protective coatings for paper, cardboard, fabrics and other flexible materials, to which they may be laminated by heat or pressure or with an adhesive. The unsupported films or laminated articles are particularly useful as electrical insulating materials.

As many apparently widely different embodiments of this invention may be made without departing from the spirit and scope thereof, it is to be understood that I do not limit myself to the specific embodiments thereof except as defined in the appended claims.

I claim:

1. A process for preparing transparent films from a normally solid polymer of ethylene which melts at a temperature of from 100° C. to 120° C., said process comprising casting a film on a casting support from a liquid composition, the temperature of said liquid composition being above the melting point of said polymer, and the temperature of said support being below the melting point of said polymer but not more than 15° C. below the melting point of said polymer, said liquid composition comprising a modifying agent and a solution of said polymer, maintaining the film in contact with said support until substantially all of the solvent is evaporated from the film, quenching the film by contacting it with a non-solvent cooling liquid at a temperature of from 0° C. to 70° C. just prior to crystallization and haze formation in the film, and then stripping from the casting support the transparent film thus obtained, said modifying agent being present in amount of from 0.1% to 10% of the weight of the ethylene polymer in said solution and consisting of a substance selected from the group consisting of fatty acids containing from 6 to 30 carbon atoms, and salts of said acids.

2. The process set forth in claim 1 in which said small amount of substance contained in said solution of ethylene polymer is aluminum palmitate.

FRANKLIN TRAVISS PETERS.